United States Patent [19]

Kingsbury et al.

[11] Patent Number: 4,868,699
[45] Date of Patent: Sep. 19, 1989

[54] MICROFLOPPY DISC DRIVE HEAD CLEANER

[75] Inventors: Philip C. O. Kingsbury, Henley-on-Thames, England; Roger V. Follansbee, Santa Barbara, Calif.

[73] Assignee: Automation Facilities Limited, Wargrave, England

[21] Appl. No.: 210,715

[22] Filed: Jun. 21, 1988

Related U.S. Application Data

[63] Continuation of Ser. No. 844,805, Mar. 27, 1986, abandoned, which is a continuation-in-part of Ser. No. 734,568, Mar. 15, 1985, abandoned.

[30] Foreign Application Priority Data

Mar. 27, 1985 [GB] United Kingdom ............... 8507944

[51] Int. Cl.[4] .................. G11B 5/41; G11B 23/033
[52] U.S. Cl. .................................. 360/128; 360/133
[58] Field of Search ............... 360/133, 128; 369/72; 206/444

[56] References Cited

U.S. PATENT DOCUMENTS

| | | | |
|---|---|---|---|
| 3,489,608 | 1/1970 | Jacobs et al. | 134/254 |
| 3,729,720 | 4/1973 | Darling et al. | 360/99 |
| 3,908,824 | 9/1975 | Takahara et al. | 206/312 |
| 3,931,644 | 1/1976 | Ward | 360/133 |
| 4,038,693 | 7/1977 | Huffine et al. | 360/99 |
| 4,040,105 | 8/1977 | Slindee | 360/99 |
| 4,052,750 | 10/1977 | Barber et al. | 360/135 |
| 4,065,798 | 12/1977 | Sugisaki et al. | 360/128 |
| 4,106,067 | 8/1978 | Masuyama et al. | 360/137 |
| 4,180,840 | 12/1979 | Allan | 360/128 |
| 4,291,353 | 9/1981 | Fletcher et al. | 360/128 |
| 4,374,404 | 2/1983 | Davis | 360/128 |
| 4,375,658 | 3/1983 | Martinelli | 360/128 |
| 4,377,831 | 3/1983 | Davis et al. | 360/128 |
| 4,470,083 | 9/1984 | Doering et al. | 360/128 |
| 4,499,516 | 2/1985 | Purdy et al. | 360/128 |
| 4,520,470 | 5/1985 | d'Alayer de Costemore d'Arc | 360/133 |
| 4,628,388 | 12/1986 | Kawabe | 360/133 |
| 4,630,157 | 12/1986 | Bond | 360/133 |
| 4,639,813 | 1/1987 | Uno | 360/133 |

FOREIGN PATENT DOCUMENTS

| | | |
|---|---|---|
| 0052865 | 6/1982 | European Pat. Off. . |
| 3403601 | 8/1985 | Fed. Rep. of Germany ...... 360/133 |
| 2271632 | 12/1975 | France . |
| 58-141473 | 8/1983 | Japan ................. 360/97 |
| 2091472 | 7/1982 | United Kingdom . |

OTHER PUBLICATIONS

Abrasive Diskette for Lapping and Cleaning Magnetic Recording Heads, G. R. Knutson et al. m IBM TDB 1978, vol. 20, No. 8, pp. 3231–3232.

Primary Examiner—John H. Wolff
Assistant Examiner—Matthew J. Bussan
Attorney, Agent, or Firm—Fulwider, Patton, Rieber, Lee & Utecht

[57] ABSTRACT

Apparatus for cleaning microfloppy disc drive heads comprises two hinged leaves (38a, 38b) forming an openable shell (38) and a replaceable disc of cleaning material (70) sandwiched between the leaves. Each leaf has an aperture (16) through which a disc drive head (not shown) may contact a cleaning disc when the shell containing the cleaning disc is inserted into the disc drive, and one aperture is covered by a removable label (62) for use in a single-sided drive which is removed for double-sided use. The label is on the interior surface of the leaf. The hinge is formed by another larger label member (90) on the exterior of the shell.

14 Claims, 6 Drawing Sheets

MICROFLOPPY DISC DRIVE HEAD CLEANER

CROSS-REFERENCE TO RELATED APPLICATION

This is a continuation, of application Ser. No. 06/844,805 now abandoned, filed Mar. 27, 1986 which is a continuation-in-part of Ser. No. 06/734,568 filed Mar. 15, 1985 now abandoned.

BACKGROUND OF THE INVENTION

The present invention relates to the cleaning of the read/write heads in drives for microfloppy disc cartridges.

Floppy discs are well known for use as magnetic stores for computers, word processors and the like. A floppy disc comprises a disc of a magnetisable polyester-based material which can be rotated at high speed, by apparatus known as a disc drive. Data can be written onto or read from the magnetisable material by an appropriate magnetic head in the disc drive.

The floppy discs are prone to malfunction if they become dirty or dusty and for this reason they are sealed in a protective shell or sleeve. Several disc sizes have been proposed. One proposal uses a 3½ inch (8.89 cm) disc, sealed in a rigid, protective shell which has apertures to allow a magnetic head to have access to one or both sides of the disc, and an aperture to allow a drive mechanism to rotate the disc. On both sides of the disc, a liner of lint-free material between the disc and the shell keeps the disc clean. The unit comprising the liner and disc sealed inside the shell is known as a cartridge.

The magnetic heads also accumulate dirt, oxide particles and other contamination which adversely affects their accuracy in use, and reduces their life. Accordingly, it is desirable to keep the heads clean.

An object of the present invention is to provide a method of and apparatus for cleaning microfloppy disc drive heads.

SUMMARY OF THE INVENTION

The present invention provides apparatus for cleaning microfloppy disc drive heads comprising two leaves forming an openable shell, and a replaceable disc of cleaning material sandwiched between the leaves, wherein at least one leaf has an aperture or access window through which a cleaning disc may clean a disc drive head when the shell containing the cleaning disc is inserted into the disc drive. Preferably the leaves of the shell are hinged together.

The present invention further provides a method of cleaning floppy disc drive heads in which a replaceable disc of cleaning material is sandwiched between two leaves forming an openable shell, and the shell containing the disc is inserted into a disc drive, whereby the disc may clean the drive head through an aperture or access window in one of the leaves.

In practice two opposed windows are required for head access with double-sided disc drives, whereas only one window is needed for head access with a single sided disc drive. In the case of single sided drives, in order to achieve effective cleaning, adequate contact has to be maintained between the head and the cleaning disc. This requires the application of pressure on the reverse side of the disc, opposite the head. Such pressure can be achieved by means of a moulded mound or a sprung plate on the shell, but this requires two types of cleaning apparatus for use with single and double sided drives respectively. This is more expensive and also means that both types have to be stocked separately by the retailer.

Alternatively, pressure could be applied by having two opposed windows and making use of the pressure pad incorporated in the disc drive, the function of which is to ensure adequate contact between magnetic media and the head in normal use of the drive. However, the pressure pad cannot be allowed to contact the cleaning disc directly since this would destroy the pad. Another possibility might therefore be thought to be to use an adhesive "label" on the outside of the cartridge to cover one of the two windows and act as a barrier between the pressure pad and the cleaning disc with a single-sided drive, the label being removed for use with double sided drives, along the lines of known systems for use with large floppy discs (see British Patent Application 2 091 472 and European Patent Application 56317). In these cases the discs are kept in thin flexible jackets and the pressure pad of the drive transmits sufficient force through the adhesive label to maintain the required contact between the head and the disc. However, we have appreciated that such an arrangement with a label over the window is not practicable with a 3½ inch drive, because the thickness of the shell wall is such that the label can not deform sufficiently to allow the pressure pad to maintain the required pressure, through the label, on the disc.

Accordingly this invention provides in a further aspect apparatus for cleaning microfloppy disc drive heads comprising a sleeve, and a replaceable disc of cleaning material within the sleeve, wherein the sleeve has opposed apertures through which opposed disc drive heads may contact opposite sides of a said cleaning disc when the sleeve containing the cleaning disc is inserted into the disc drive, and including a conversion label covering one of the apertures and located over the aperture on the interior surface of the sleeve. Preferably the label is secured along one side edge only allowing maximum transmission of pressure through the label. The edge is chosen so that the rotating disc meets the secured edge first. A preferred material for the label is biaxially-oriented polyester film and is preferably less than 80 microns thick.

Other features of the invention are defined in the appended claims.

BRIEF DESCRIPTION OF THE DRAWINGS

Commencing with a description of a standard floppy disc cartidge, the invention will now be described by way of example, with reference to the accompanying drawings in which.

DETAILED DESCRIPTION OF THE PREFERRED EMBODIMENTS

Figure 1:
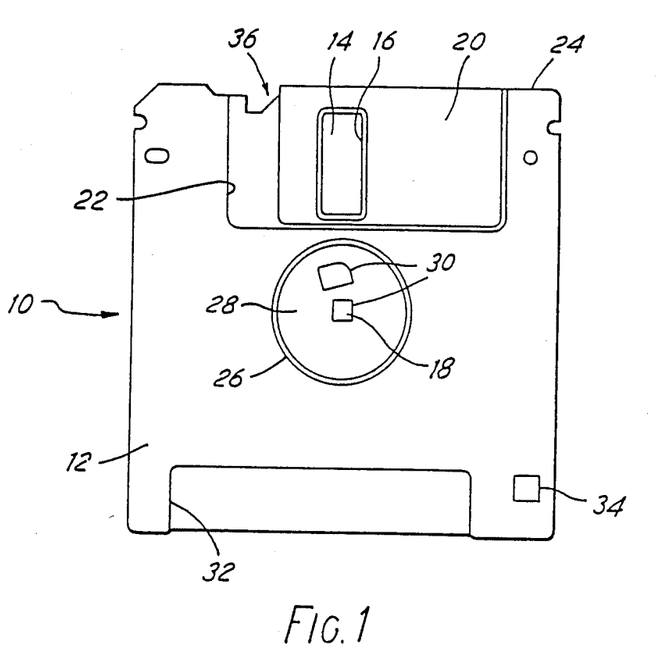
FIG. 1 shows the under-side of a standard 3½ inch floppy disc cartridge.

FIG. 1 shows a cartridge 10 for a 3½ inch (8.89cm) microfloppy disc. The sleeve or shell 12 of the cartridge 10 is generally square and is formed of two portions permanently sealed together to prevent the ingress of dirt. The magnetic disc 14 housed within the shell 12 is visible in FIG. 1 through an opening or access window 16 in the shell. The opening 16 extends generally along a radius of the disc 14 which is centred at 18. A shutter 20 is movable within a depression 22 in the region of the opening 16 to open and close the opening 16. The shutter 20 is spring biased to a position in which the opening 16 is closed and dust is prevented from entering the cartridge. Means are provided in the disc drive for opening the shutter 20 when the cartridge is inserted, so that a magnetic head can read from or write on the disc 14. A second opening, aligned with the opening 16 and not visible in FIG. 1, allows access to the other surface of the disc 16, and the second opening is also protected by the shutter 20 which extends around the edge 24 of the cartridge 12.

A central opening 26 in the shell 12 on one side of the cartridge receives a central, metal hub 28 of the disc 16. Two holes 30 in the hub 28 allow the disc 16 to be driven about its centre 18.

A depression 32 in the shell 12 is provided for receiving a label indicating the manufacturer's name etc. Other apertures in the shell and features of the shell outline are provided for various control functions. For instance, an aperture 34 is provided for cooperation with a mechanism in the disc drive to prevent data being written onto the disc 14 unless a plug is present in the aperture 34. A register notch 36 enables the disc drive to be disabled until the cartridge 10 has been inserted with the correct orientation.

Figure 2:
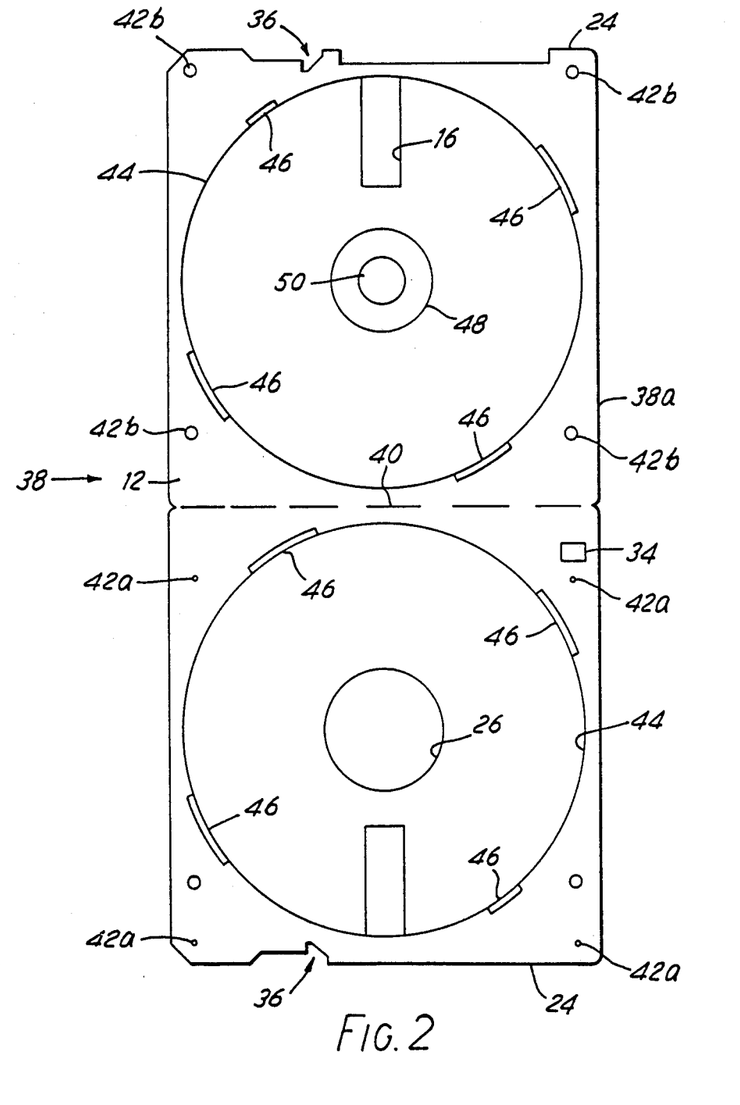
FIG. 2 shows a protective shell of a leaved cartridge embodying the invention.

FIG. 2 shows the inside of a jacket or shell 38 for use with a disc of cleaning material. Features common to the shell 12 of the cartridge 10 of FIG. 1 and the shell 38 of FIG. 2 are indicated by like numerals. The shell 38 comprises two leaves 38a, 38b hinged together along a line 40. The leaves 38a, 38b fold from the open position shown in FIG. 2 to a closed position in which they form a shell with outside dimensions similar to those of the shell 12 (FIG. 1). Releasable fastening means are provided on the shell 38, for the purpose of fastening the shell in its closed position. The fastening means include four stud-and-collar connectors at four points around the periphery of the shell. Each such connector comprises on one leaf 38b a stud 42a and at a corresponding position on the other leaf 38a a resilient collar 42b into which the stud 42a can be pushed, and which thereafter grips the studs 42a. Although connectors are shown at four points around the shell perimeter, clearly such means may be provided at a greater or smaller number of points. Releasable fastening means of types other than that described may be used. For instance, adhesive fastening devices could be used.

Each leaf 38a, 38b defines a disc receiving area 44 and disc retaining ribs 46 around the area 44. At the centre of the leaf 38 is a circular rim 48 over which a disc hub, which is cup shaped, may fit, and optionally a low friction pad 50 which members of the disc drive abut through the holes 30 in the disc hub 28 (see FIG. 1). Because the shell is intended to be opened by hinging along the line 40, no shutter is provided over the openings 16. The absence of a shutter does not adversely affect operation of the disc drive.

Figure 7:
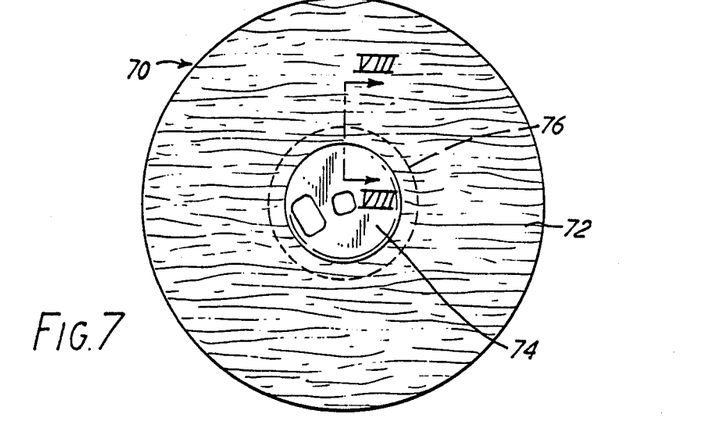
FIG. 7 is a plan view of one cleaning disc with the cleaning material adhesively secured to the hub.

For cleaning the heads of disc drive apparatus, cleaning discs are used in the shell 38. The cleaning discs have the same dimensions as the standard magnetic disc 16 used in the cartridge of FIG. 1. As shown in FIG. 7, a cleaning disc 70 uses a disc of lint-free cleaning material 72 mounted on a hub 74, rather than a disc of magnetic material. A new cleaning disc is placed in one leaf, and the shell is closed and fastened, using the fastening means 42a, 42b, to form a cleaning cartridge which can be used in a disc drive. Cleaning fluid is preferably applied to the disc before the shell 38 is closed.

When the disc drive is operated with a cleaning cartridge inserted, the cleaning disc rotates at the normal speed of a magnetic disc, lightly rubbing the magnetic heads and applying cleaning fluid to them. The heads are thereby cleaned, whereafter the cleaning cartridge is removed from the disc drive, the shell 38 is opened, and the soiled cleaning disc is removed from the shell and discarded. There may be circumstances in which it is desired to re-use the discs. The shell can then be provided with an opening on one of its two main surfaces to allow cleaning fluid to be applied to the disc without the need to open the shell.

However, when the head again needs cleaning, a new cleaning disc is preferably used. Therefore, a single shell 38 and a plurality of cleaning discs, by virtue of the opening facility of the shell 38, enables the head to be cleaned with a fresh cleaning disc on each occasion.

The cleaning discs may be made from the Du Pont polyester material Reemay 2024 or 2032.

Figure 8:
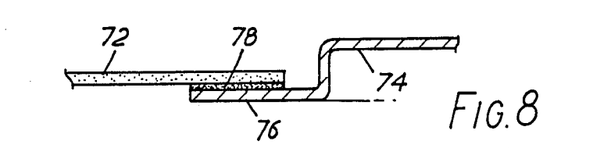
FIG. 8 is a detail section taken on the line VIII—VIII in FIG. 7.

As shown in FIGS. 7 and 8 the annular disc of cleaning material 72 is attached to a flange portion 76 of the hub 74 by a suitable adhesive 78. Only an adhesive which is compatible with the cleaning solvent to be employed on the disc can be used.

Alternatively mechanical fixing can be used. Teeth can be punched in the metal hub, for instance by cutting along two sides of a triangular region of the hub and pushing the region out of the plane of the hub to form a triangular tooth. The cleaning disc is then impaled on a set of such teeth which are pushed back into the plane of the disc to hold the disc firmly.

Figure 9:
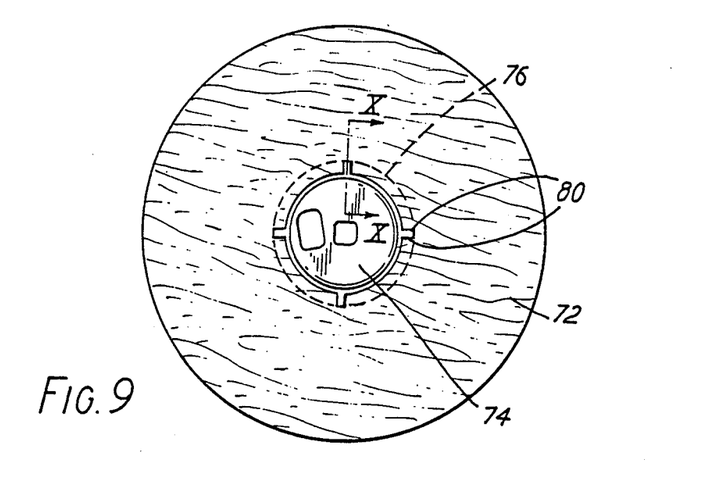
FIG. 9 is a plan view of an alternative cleaning disc with the cleaning disc mechanically secured to the hub.
Figure 10:
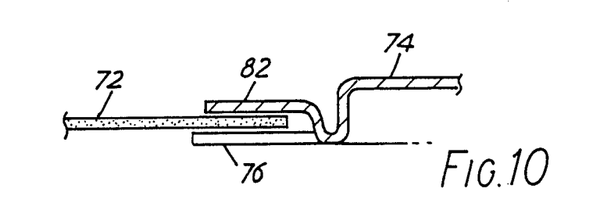
FIG. 10 is a detail section taken on the line X—X in FIG. 8.

Another mechanical method is shown in FIGS. 9 and 10. In this the flange 76 of the hub 74 is cut by two closely-spaced radial cuts 80 to form four rectangular teeth 82. These are bent as shown in FIG. 10 to allow the cleaning disc 72 to be trapped at its inner edge between the teeth on one side and the rest of the flange 76 on the other. To this end the inner diameter of the annular cleaning disc is intermediate the inner and outer diameters of the flange 76. The teeth 82 may be pressed back towards the plane of the flange 76 when the disc 72 is in position to trap the inner margin of the disc and attach it securely to the hub.

The preferred material for the hub is 430 stainless steel alloy, but other materials could be considered including half hard aluminum, annealed Duralumin TM, steel, plated steel (for instance tin plated steel), acetal resin and polysulphone.

As shown in FIG. 2 hinging between the two leaves of the shell 38 is integral with the leaves. The material of the shell must then be able to withstand repeated folding. Arbitrarily, a lifetime of 50 folding operations may be set as a requirement of the material. Examples of suitable materials for the shell are virgin or talc-filled polypropylene, acrylonitrite butadiene styrene (ABS), nylon, (Nylon 6, Nylon 6,6, Nylon 11, or Nylon 12) acetal resin and high impact polystyrene.

As thus far described, the cleaning cartridge is designed for use in double-sided disc drives, and thus has apertures 16 in both leaves 38a, 38b of the shell. However, we have appreciated that it would be highly desirable to be able to use the same assembly for both double and single sided drives.

Figure 3:
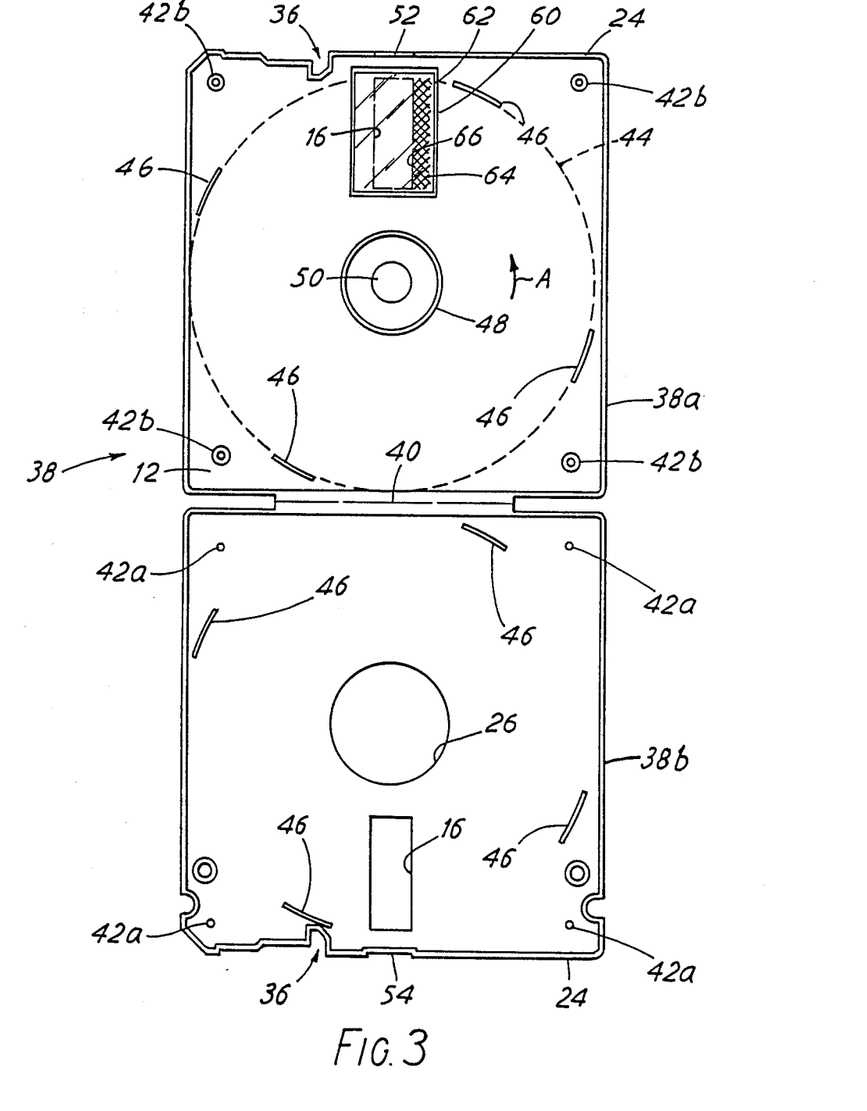
FIG. 3 is a view similar to FIG. 2 of an improvement.

Thus as shown in the improvement of FIG. 3 the leaf 38a has a shallow rectangular depression 60 moulded on its interior surface around the aperture 16. Over this depression 60 and thus over the aperture 16 is placed a rectangular protection or conversion label 62 of polyester material. This label 62 is secured by means of a suitable adhesive 64 applied along one only of the longer edges of the label. A disc when inserted in the shell rotates in the direction A shown on FIG. 3, so that as it rotates it tends to draw the label 62 flat into the depression 60 and there is no danger of the label buckling or bowing. Nevertheless the label can give enough to allow the pressure pad to act through it against the cleaning disc to provide the desired back-up pressure, without the cleaning disc damaging the pressure pad.

The label 62 is preferably less than about 80 microns thick, and co-extruded biaxially oriented polyester film of 25 microns thick is preferred, though thicknesses of 50 microns are also suitable. As described above the label is adhered by an adhesive (for example, a cyanoacrylate adhesive) but an alternative possibility is to heat seal the edge of the label to the interior surface of the shell.

When the cartridge is to be used with double sided drives the shell is opened and the label removed. It can be arranged so that it is peeled off, but in practice it may be as good as if not better to allow the label to tear along the line 66 of the edge of the glued margin of the label. In this way the adhesive remains covered by the remnant of the label. A line of weakness could be provided at 66 to assist this.

The use of an openable shell is thus particularly advantageous in enabling the location of the lable 62 to be on the interior surfaces of the shell, while being accessible by opening the shell so as to be readily removable when the cartridge is to be used with doubled sided disc drives.

In FIG. 3 there is also a lip 52 on one leaf 38a which protrudes on the side of the leaf which will form the interior of the closed shell and will then engage with a recess 54 in the other leaf 38b. The lip 52 provides a way of allowing the user to prise open the shell by depressing the lip 52 away from engagement with recess 54 and pulling the shell open to release the connectors 42.

Figure 4:
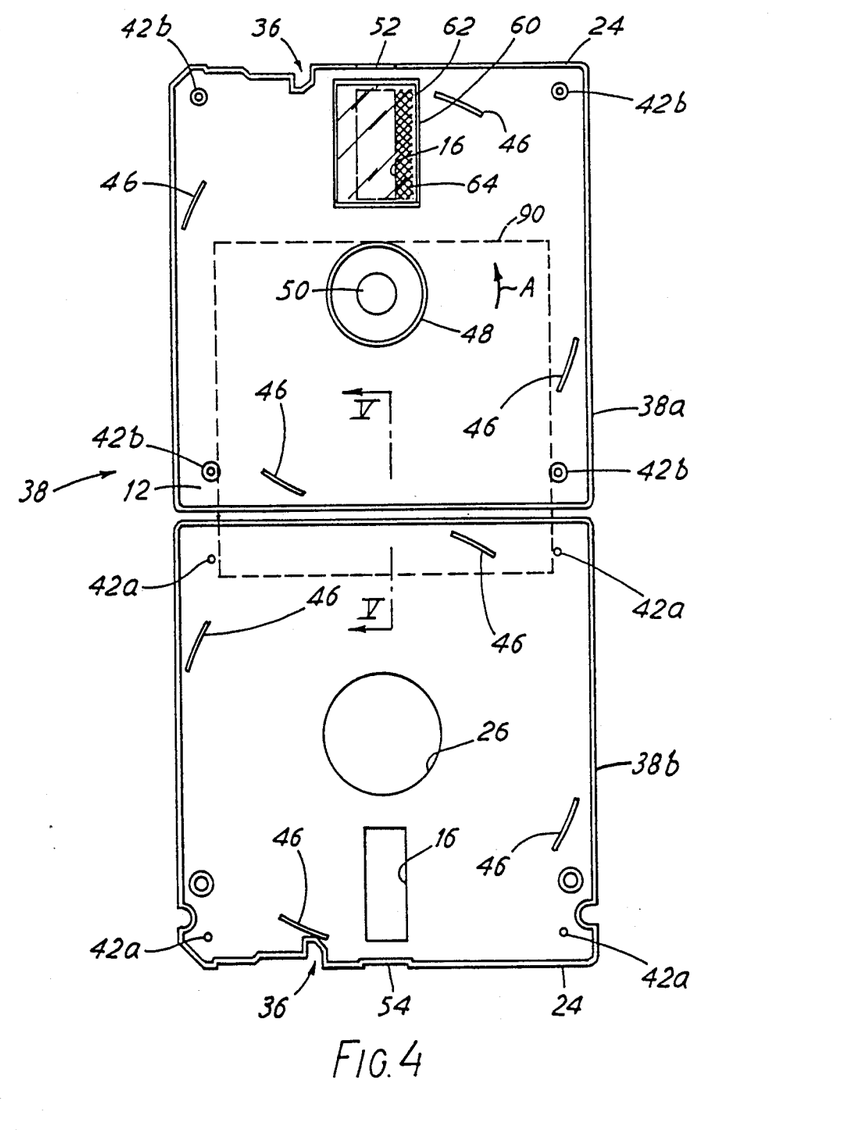
FIG. 4 is a view similar to FIG. 2 of a modified shell.
Figure 5:
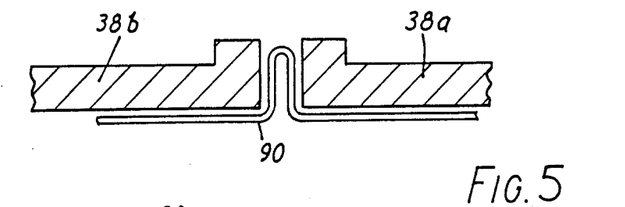
FIG. 5 is a detail section taken on the line V—V in FIG. 4 and illustrating the hinge action.
Figure 6:
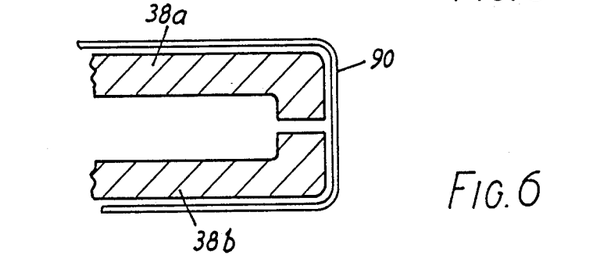
FIG. 6 is a view of the part shown in FIG. 5 with the hinge closed.

Another modified shell is illustrated in FIGS. 4 to 6, in which the same reference numerals are used as in FIG. 2 where appropriate. The difference relates to the hinge construction, and in FIG. 4 the shell is made in two separate parts 38a, 38b. The hinge is then formed by a large rectangular label 90 fixed over a marginal part of the outside of each of the shell parts by pressure sensitive adhesive. The hinge action of the label 90 is illustrated in FIGS. 5 and 6. The shell may be provided with a slight depression (not shown) or recess to receive the label thickness of e.g. 25 microns. The label 90 can be printed to indicate the nature and manufacturer of the product, etc., and to this end extends over a substantial portion of one (38a) of the shells while only extending some 10–15 mm onto the other shell 38b. The label material can be biaxially oriented polyester or nylon film, PVC, polypropylene, regenerated cellulose film or combinations of these in laminate form with themselves or other materials e.g. paper.

The hinge construction is thus easy to make and is effective in operation and stands up to the required wear during the lifetime of the shell. Nevertheless it does not increase the external dimensions of the cartridge, and does not interfere with the disc drive operation.

We claim:

1. Apparatus for cleaning read/write heads in microfloppy disc drive units comprising:
   a disc cartridge having two generally rectangularly shaped leaves releasably secured together forming an openable shell and defining an inner chamber therebetween, a peripheral edge of one leaf and an opposing peripheral edge of the other leaf forming an outer peripheral edge of the shell;
   hinge means interconnecting said two leaves at said opposing peripheral edges thereof comprising a relatively thin label member which is secured to outer sides of said two leaves adjacent to said peripheral edges thereof and which extends over said outer peripheral edge of the shell; and
   a replaceable cleaning disc having a driving hub and an annular shaped piece of cleaning material secured to the perimeter of the driving hub, said cleaning disc being sandwiched in the inner chamber between the leaves and disposed for rotation therein, at least one leaf having an aperture through which a magnetic head contacts said cleaning material of the cleaning disc when the shell containing the cleaning disc is inserted into a disc drive unit.

2. Apparatus according to claim 1, wherein the leaves of the shell are hinged together.

3. Apparatus according to claim 2, wherein the leaves and hinge of the shell are integral.

4. Apparatus according to claim 1, wherein the two leaves of the shell are secured together by releasable fastening means provided on the interior of the shell adjacent peripheral edges thereof.

5. Apparatus according to claim 4, wherein the releasable fastening means comprises at least one stud projecting from an interior surface of one leaf and a cooperating resilient collars projecting from an interior surface of the other leaf for each of said studs which are adapted to receive the studs when the two leaves are closed to form the shell.

6. Apparatus according to claim 4, wherein said releasable fastening means are provided at four points around the perimeter of the shell.

7. Apparatus according to claim 1, wherein an aperture is provided in each of the leaves, and wherein a removable conversion label is applied to an interior surface of one of the leaves covering the aperture therein.

8. Apparatus according to claim 1, in which the label is secured by an adhesive.

9. Apparatus according to claim 1, in which the label is secured by heat sealing.

10. Apparatus according to claim 1 wherein the leaf is provided with a moulded depression in the interior surface thereof to receive the label.

11. The apparatus of claim 1 wherein the hub of the replaceable cleaning disc is provided with a flange with an inner diameter less than and an outer diameter greater than the inner diameter of the annular disc of cleaning material, the flange being severed radially to form portions on alternate sides of the inner margin of the annular disc to trap and attach the annular disc to the hub.

12. A cleaning disc according to claim 11 in which the flange is severed to provide spaced substantially rectangular teeth.

13. A cleaning disc for cleaning magnetic heads of microfloppy disc drive units comprising a rigid hub having a peripheral flanges and an annular piece of cleaning material secured to the perimeter thereof, the hub having a flange with an inner diameter less than and an outer diameter greater than the inner diameter of the annular piece of cleaning material, the flange being severed radially to form portions on alternate sides of the inner margin of the annular piece to thereby secure the annular piece to the hub.

14. A cleaning disc according to claim 13, in which the flange is severed to provide spaced substantially rectangular teeth.

* * * * *